United States Patent
Rose et al.

(10) Patent No.: US 10,146,556 B2
(45) Date of Patent: Dec. 4, 2018

(54) SYSTEM AND METHOD TO PERFORM AN OS BOOT USING SERVICE LOCATION PROTOCOL AND LAUNCHING OS USING A DYNAMIC UPDATE OF NETWORK BOOT ORDER WITHOUT A REBOOT

(71) Applicant: Dell Products L.P., Round Rock, TX (US)

(72) Inventors: Charles E. Rose, Nashua, NH (US); Mark W. Shutt, Austin, TX (US); Sumanth Vidyadhara, Bangalore (IN); Terry W. Liles, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 325 days.

(21) Appl. No.: 14/086,176

(22) Filed: Nov. 21, 2013

(65) Prior Publication Data

US 2015/0143094 A1    May 21, 2015

(51) Int. Cl.
*G06F 9/44* (2018.01)
*G06F 9/4401* (2018.01)

(52) U.S. Cl.
CPC .................................. *G06F 9/4416* (2013.01)

(58) Field of Classification Search
CPC ......... H04L 67/34; G06F 9/445; G06F 9/4416
See application file for complete search history.

(56) References Cited

U.S. PATENT DOCUMENTS

| | | | |
|---|---|---|---|
| 6,292,890 B1 | 9/2001 | Crisan | |
| 7,971,045 B1 * | 6/2011 | Currid | G06F 9/4416 709/226 |
| 8,875,127 B2 * | 10/2014 | Chan | H04L 43/04 717/172 |
| 2003/0046529 A1 * | 3/2003 | Loison | G06F 9/4416 713/2 |
| 2009/0113198 A1 * | 4/2009 | Liu | H04L 41/0803 713/2 |
| 2010/0077066 A1 * | 3/2010 | Chawla | G06F 9/4416 709/222 |
| 2011/0252224 A1 * | 10/2011 | Chandrasekhara | G06F 9/45558 713/2 |

(Continued)

OTHER PUBLICATIONS

Service Location Protocol Administration Guide, SUN Microsystems, Inc., available at https://docs.oracle.com/cd/E19455-01/806-1412/806-1412.pdf, published Feb. 2000.*

(Continued)

*Primary Examiner* — Kim Huynh
*Assistant Examiner* — Kevin M Stewart
(74) *Attorney, Agent, or Firm* — Terrile, Cannatti, Chambers & Holland, LLP; Stephen A. Terrile

(57) ABSTRACT

A system, method, and computer-readable medium are disclosed for a boot mapping system. More specifically, in certain embodiments, BIOS of an information handling system includes a boot mapping system which allows the information handling system to boot up regardless of a boot order change in a network mode of operation or a BIOS boot order change. Additionally, in certain embodiments, the boot mapping system further includes a service location protocol (SLP) which locates operating system images based on the type of network protocol selected for deployment.

18 Claims, 3 Drawing Sheets

(56) References Cited

U.S. PATENT DOCUMENTS

2012/0284494 A1* 11/2012 Funk .................... G06F 9/4401
                   713/2

OTHER PUBLICATIONS

M. Bakke et al., Finding iSCSI Targets and Name Servers Using SLP, http://www.ietf.org/proceedings/51/I-D/draft-ietf-ips-iscsi-slp-01.txt, Jul. 2001.

* cited by examiner

SYSTEM AND METHOD TO PERFORM AN OS BOOT USING SERVICE LOCATION PROTOCOL AND LAUNCHING OS USING A DYNAMIC UPDATE OF NETWORK BOOT ORDER WITHOUT A REBOOT

BACKGROUND OF THE INVENTION

Field of the Invention

The present invention relates to the management of information handling systems. More specifically, embodiments of the invention provide a system, method, and computer-readable medium for performing an operating system boot operation using a service location protocol and launching the operating system using a dynamic update of network boot order within a reboot.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One issue that relates to information handling systems occurs when performing operating system (OS) deployments. More specifically, when performing an OS deployment via a network mode of operation (e.g., using an Internet Small Computer System Interface (iSCSI) or Fibre Channel over Ethernet (FCOe) where the OS media is accessed via the iSCSI or FCOe Logical Unit Number (LUN)) it is important to be able to detect network settings. It is also important to initiate the OS deployment from the network location. When performing the OS deployment, the network stack (which includes Basic Input Output System (BIOS) and/or a Unified Extensible Firmware Interface (UEFI)) authenticates and changes the boot order within the information handling system to add the network devices at the next boot. When a change in BIOS boot order is performed, it is necessary for the information handling system reboot, likely losing all established authentication information. FIG. 1, labeled Prior Art, shows a flow chart of a boot mapping operation.

SUMMARY OF THE INVENTION

A system, method, and computer-readable medium are disclosed for providing a boot mapping system. More specifically, in certain embodiments, BIOS of an information handling system includes a boot mapping system which allows the information handling system to boot up regardless of a boot order change in a network mode of operation or a BIOS boot order change. Additionally, in certain embodiments, the boot mapping system further includes a service location protocol (SLP) which locates OS images based on the type of network protocol selected for deployment. More specifically in certain embodiments, when the network protocol corresponds to Network File System (NFS), Common Internet File System (CIFS), Preboot eXecution Environment (PXE) and/or ISCSI based protocol, then during OS Deployment, the boot mapping system provides an updated network boot order which uses the service location protocol to determine any services which may be needed for the network operating system deployment. For example if the network protocol corresponds to an NFS client then the boot mapping tool accesses a UEFI based management tool, locates the OS image from an NFS server and continues with the OS boot operation. Additionally, in certain embodiments, the SLP is stored within an SLP server on the network as part of the install infrastructure. Additionally, in certain embodiments the SLP server is included within an install infrastructure which further includes NFS, ISCSI and FCoE infrastructure.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
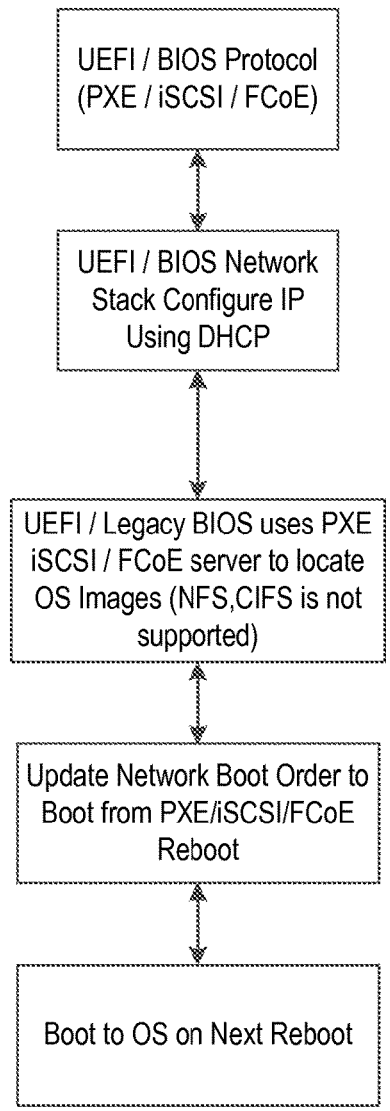
FIG. 1, labeled Prior Art, shows a flow chart of a boot mapping operation.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
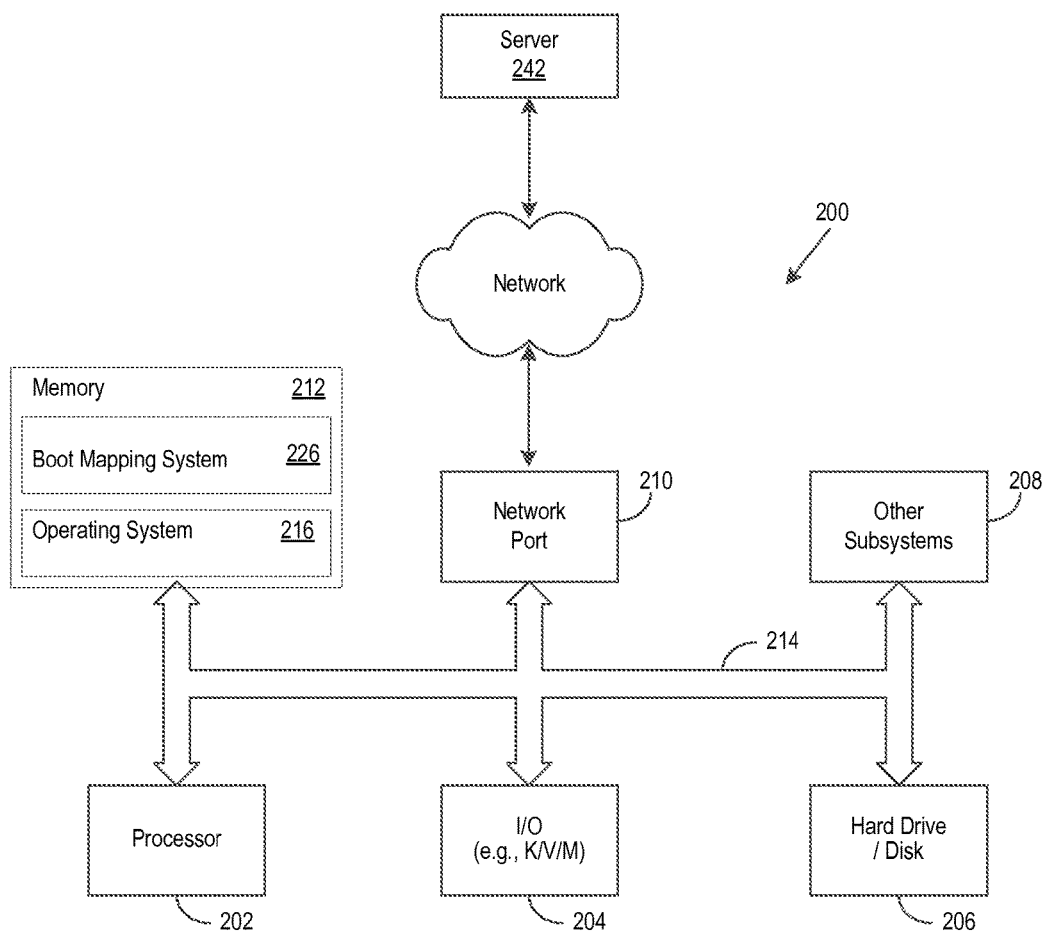
FIG. 2 shows a generalized block diagram of an information handling system as implemented in the system and method of the present invention.

FIG. 2 is a generalized illustration of an information handling system 200 that can be used to implement the system and method of the present invention. The information handling system 200 includes a processor (e.g., central processor unit or "CPU") 202, input/output (I/O) devices 204, such as a display, a keyboard, a mouse, and associated controllers, a hard drive or disk storage 206, and various other subsystems 208. In various embodiments, the information handling system 200 also includes network port 210 operable to connect to a network 240, which is likewise accessible by a server 242. The information handling system 200 likewise includes system memory 212, which is interconnected to the foregoing via one or more buses 214. System memory 212 further comprises operating system (OS) 216 and in various embodiments may also comprise a boot mapping system 226. In one embodiment, the information handling system 200 is able to download the boot mapping system 226 from the server 242. In another embodiment, the boot mapping system 226 is provided as a service from the server 242.

More specifically, in certain embodiments, BIOS of an information handling system includes the boot mapping system 226 which allows the information handling system 200 to boot up regardless of a boot order change in a network mode of operation or a BIOS boot order change. Additionally, in certain embodiments, the boot mapping system 226 further includes a service location protocol (SLP) which locates OS images (e.g., from server 242) based on the type of network protocol selected for deployment. More specifically in certain embodiments, when the network protocol corresponds to Network File System (NFS), Common Internet File System (CIFS), Preboot eXecution Environment (PXE) and/or ISCSI based protocol, then during OS Deployment, the boot mapping system 226 provides an updated network boot order which uses the service location protocol to determine any services which may be needed for the network operating system deployment. For example if the network protocol corresponds to an NFS client, then the boot mapping system 226 accesses a UEFI based management tool, locates the OS image from an NFS server and continues with the OS boot operation. Additionally, in certain embodiments, the SLP is stored within an SLP server on the network as part of the install infrastructure. Additionally, in certain embodiments the SLP server is included within an install infrastructure which further includes NFS, ISCSI and FCoE infrastructure. In various embodiments, the server 242 may correspond to one or more of the NFS server, the SLP server as well as the iSCSI and FCoE infrastructure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3:
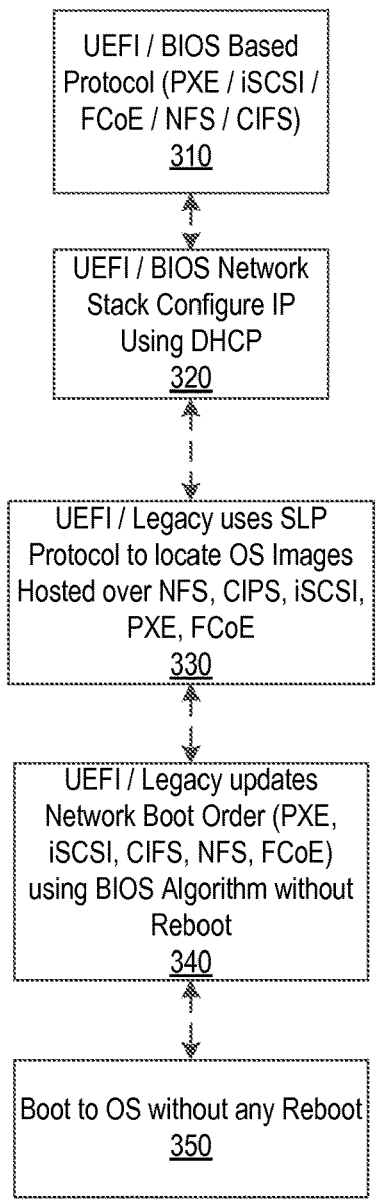
FIG. 3 shows a flow chart of the operation of a boot mapping system in accordance with the present invention.

Referring to FIG. 3, a flow chart of the operation of a boot mapping system 226 in accordance with the present invention is shown. More specifically, at step 310, the boot mapping system 226 determines that an OS deployment is to be enabled on via e.g., a preboot Unified Extensible Firmware Interface (UEFI) type management tool. The boot mapping system 226 identifies the service required for OS Deployment (e.g., whether an NFS service, a CIFS service, an iSCSI service, an FCoE service is to be used for OS Deployment. Next, at step 330, the boot mapping system 226 enables a service location protocol to check for servers hosting the Services required from the host for OS deployment such as NFS based servers for OS deployment, CIFS or iSCSI based. Next, at step 320, the boot mapping system 226 enables an Internet Protocol (IP) On the Host operation using a Dynamic Host Configuration Protocol (DHCP) service. Next, at step 340, the boot mapping system 226 updates a network boot order for the information handling system. In certain embodiments, the boot mapping system uses a BIOS operation such as a one shot boot order operation to boot to a network location selected for performing the OS boot. The one shot boot feature bypasses the standard BIOS boot behavior (i.e., the boot sequence) to directly boot to any targeted boot device. This is a temporary bypass operation (i.e., a one shot feature). Subsequent boots revert to the standard BIOS boot behavior. Finally, at step 350, the boot mapping system 226 continue the OS boot operation without requiring a reboot of the information handling system.

By using the boot mapping system 226, a PXE boot operation may be eliminated as this type of boot operation is potentially insecure due to the Trivial File Transfer Protocol (TFTP) protocol used for file transfer during this type of boot operation. Additionally, the boot mapping system 226 provides support for OS deployment across varied network clients such as CIFS, NFS, FCoE, iSCSI with authentication enabled for secure OS deployment and OS Boot. Additionally, the boot mapping system 226 saves time when performing an OS deployment as there is no need for reboot for every network order configuration such as by using a BIOS one shot boot menu order configuration.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a boot mapping operation, comprising:
   determining whether an operating system (OS) deployment is to be enabled;
   locating network locations of OS images by using a service location protocol (SLP) to transmit service requests to discover OS images that would be communicated by a server using a specific type of network protocol that is selected by a client for deployment, the type of network protocol selected for deployment corresponding to one of a Network File System (NFS) network protocol, a Common Internet File system (CIFS) network protocol, a Preboot eXecution Environment (PXE) network protocol and an ISCSI based network protocol, each of the OS images being stored on a respective server;
   enabling the service location protocol to check for hosting services used by a host for the OS deployment, when checking for hosting services the service location protocol discovering any services needed for the OS deployment;
   updating a network boot order for an information handling system; and,
   continuing an OS boot operation without requiring a reboot of the information handling system due to the updating of the network boot order; and wherein
   the boot mapping operation provides support for OS deployment across a plurality of network clients, the network clients comprising Common Internet File System (CIFS) clients, Network File System (NFS) clients, Fibre Channel over Ethernet (FCoE) clients, and Internet Small Computer System Interface (iSCSI) clients with authentication enabled for secure OS deployment and OS Boot; and,
   selecting a network location of the network locations that are located using the SLP for performing the OS boot operation, wherein the network location that is selected corresponds to the respective server storing the OS image corresponding to the network client for a particular boot mapping operation, the particular boot mapping operation corresponding to the type of network protocol selected for deployment.

2. The method of claim 1, wherein:
   the determining whether an OS deployment is to be enabled determines whether an OS deployment is to be enabled on via a preboot Unified Extensible Firmware Interface (UEFI) type management tool.

3. The method of claim 1, wherein:
   the hosting services comprise at least one of a Network File System (NFS) service, a Common Internet File System (CIFS) service, a Preboot eXecution Environment (PXE) service and a iSCSI based protocol service.

4. The method of claim 1, wherein:
   the updating the boot order is performed via a basic input output system (BIOS) operation.

5. The method of claim 4, wherein:
   the BIOS operation comprises a one shot boot order operation, the one shot boot order operation booting the information handling system using the network location selected for performing the OS boot operation.

6. The method of claim 1, wherein:
   the SLP is stored within an SLP server on a network as part of the install infrastructure; and,
   the SLP server is included within an install infrastructure.

7. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
   determining whether an operating system (OS) deployment is to be enabled;
   locating network locations of OS images by using a service location protocol (SLP) to transmit service requests to discover OS images that would be communicated by a server using a specific type of network protocol that is selected by a client for deployment, the type of network protocol selected for deployment corresponding to one of a Network File System (NFS) network protocol, a Common Internet File system (CIFS) network protocol, a Preboot eXecution Environment (PXE) network protocol and an ISCSI based network protocol, each of the OS images being stored on a respective server;
   enabling the service location protocol to check for hosting services used by a host for the OS deployment, when checking for hosting services the service location protocol discovering any services needed for the OS deployment;

updating a network boot order for an information handling system; and, continuing an OS boot operation without requiring a reboot of the information handling system due to the updating of the network boot order; and wherein a boot mapping operation provides support for OS deployment across a plurality of network clients, the network clients comprising Common Internet File System (CIFS) clients, Network File System (NFS) clients, Fibre Channel over Ethernet (FCoE) clients, and Internet Small Computer System Interface (iSCSI) clients with authentication enabled for secure OS deployment and OS Boot; and, selecting a network location of the network locations that are located using the SLP for performing the OS boot operation, wherein the network location that is selected corresponds to the respective server storing the OS image corresponding to the network client for a particular boot mapping operation, the particular boot mapping operation corresponding to the type of network protocol selected for deployment.

8. The system of claim 7, wherein:
the determining whether an OS deployment is to be enabled determines whether an OS deployment is to be enabled on via a preboot Unified Extensible Firmware Interface (UEFI) type management tool.

9. The system of claim 7, wherein:
the hosting services comprise at least one of a Network File System (NFS) service, a Common Internet File System (CIFS) service, a Preboot eXecution Environment (PXE) service and a iSCSI based protocol service.

10. The system of claim 7, wherein:
the updating the boot order is performed via a basic input output system (BIOS) operation.

11. The system of claim 10, wherein:
the BIOS operation comprises a one shot boot order operation, the one shot boot order operation booting the information handling system using a network location selected for performing the OS boot operation, the network location being based on the type of network protocol selected for deployment.

12. The system of claim 7, wherein:
the SLP is stored within an SLP server on a network as part of the install infrastructure; and,
the SLP server is included within an install infrastructure.

13. A non-transitory, computer-readable storage medium embodying computer program code, the computer program code comprising computer executable instructions configured for:

determining whether an operating system (OS) deployment is to be enabled;

locating network locations of OS images by using a service location protocol (SLP) to transmit service requests to discover OS images that would be communicated by a server using a specific type of network protocol that is selected by a client for deployment, the type of network protocol selected for deployment corresponding to one of a Network File System (NFS) network protocol, a Common Internet File system (CIFS) network protocol, a Preboot eXecution Environment (PXE) network protocol and an ISCSI based network protocol, each of the OS images being stored on a respective server;

enabling the service location protocol to check for hosting services used by a host for the OS deployment, when checking for hosting services the service location protocol discovering any services which may be needed for the OS deployment;

updating a network boot order for an information handling system; and, continuing an OS boot operation without requiring a reboot of the information handling system due to the updating of the network boot order; and wherein a boot mapping operation provides support for OS deployment across a plurality of network clients, the network clients comprising Common Internet File System (CIFS) clients, Network File System (NFS) clients, Fibre Channel over Ethernet (FCoE) clients, and Internet Small Computer System Interface (iSCSI) clients with authentication enabled for secure OS deployment and OS Boot; and, selecting a network location of the network locations that are located using the SLP for performing the OS boot operation, wherein the network location that is selected corresponds to the respective server storing the OS image corresponding to the network client for a particular boot mapping operation, the particular boot mapping operation corresponding to the type of network protocol selected for deployment.

14. The non-transitory, computer-readable storage medium of claim 13, wherein
the determining whether an OS deployment is to be enabled determines whether an OS deployment is to be enabled on via a preboot Unified Extensible Firmware Interface (UEFI) type management tool.

15. The non-transitory, computer-readable storage medium of claim 13, wherein:
the hosting services comprise at least one of a Network File System (NFS) service, a Common Internet File System (CIFS) service, a Preboot eXecution Environment (PXE) service and a iSCSI based protocol service.

16. The non-transitory, computer-readable storage medium of claim 13, wherein:
the updating the boot order is performed via a basic input output system (BIOS) operation.

17. The non-transitory, computer-readable storage medium of claim 16, wherein:
the BIOS operation comprises a one shot boot order operation, the one shot boot order operation booting the information handling system using a network location selected for performing the OS boot operation, the network location being based on the type of network protocol selected for deployment.

18. The non-transitory, computer-readable storage medium of claim 13, wherein:
the SLP is stored within an SLP server on a network as part of the install infrastructure; and,
the SLP server is included within an install infrastructure.

* * * * *